(12) United States Patent
Takaoka

(10) Patent No.: US 6,539,116 B2
(45) Date of Patent: Mar. 25, 2003

(54) INFORMATION PROCESSING APPARATUS AND METHOD, AND COMPUTER READABLE MEMORY THEREFOR

(75) Inventor: Makoto Takaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,116

(22) Filed: Oct. 2, 1998

(65) Prior Publication Data

US 2002/0064316 A1 May 30, 2002

(30) Foreign Application Priority Data

Oct. 9, 1997 (JP) ............................................. 9-277040

(51) Int. Cl.[7] .............................. G06K 9/34; G06K 9/72; G06F 17/20; G06F 17/28; G06F 15/00
(52) U.S. Cl. ........................ 382/229; 382/176; 382/177; 382/185; 382/217; 704/1; 704/2; 704/3; 704/4; 704/5; 704/6; 707/530; 707/531; 707/532
(58) Field of Search ................................. 382/229, 231, 382/219, 209, 201, 198, 190, 187, 181, 176, 177, 180, 185, 188; 707/500, 530, 531, 532; 704/1, 2, 3, 4, 5, 6, 7, 8, 9, 10

(56) References Cited

U.S. PATENT DOCUMENTS

| 4,774,666 A | * | 9/1988 | Miyao et al. ................ 364/419 |
| 5,497,319 A | * | 3/1996 | Chong et al. .......... 364/419.02 |
| 5,555,169 A | * | 9/1996 | Namba et al. ......... 364/419.08 |
| 5,966,455 A | | 10/1999 | Saito .......................... 382/112 |
| 6,201,894 B1 | | 3/2001 | Saito .......................... 382/176 |

* cited by examiner

Primary Examiner—Bhavesh Mehta
Assistant Examiner—Yosef Kassa
(74) Attorney, Agent, or Firm—Fitzpatrick, Cella, Harper & Scinto

(57) ABSTRACT

The structure of entered document image data is analyzed and a character string in a text block that has been analyzed is subjected to pattern recognition. Synonyms and equivalents of words obtained as results of language analysis are extracted and words obtained as results of language analysis are converted to words of another language. A character string in a text block that has been analyzed is translated to another language. At least results of analyzing the structure of document image data, results of character recognition and results of language analysis are stored, and at least one of the results of extraction, results of conversion and results of translation are stored in a RAM in association with the results of character recognition.

21 Claims, 11 Drawing Sheets

INFORMATION PROCESSING APPARATUS AND METHOD, AND COMPUTER READABLE MEMORY THEREFOR

BACKGROUND OF THE INVENTION

This invention relates to an information processing apparatus and method for managing entered document image data.

When the content of document image data is reutilized, the conventional practice is to read in the document image data by image input means such as a scanner and employ data obtained by subjecting the read document image data to character recognition processing. Layouts of document image data can be quite diverse. In order to execute character recognition processing efficiently, layout analysis processing is executed before character recognition processing. The accuracy of such processing is considered important.

If document image data is preserved in the format of the results that will be obtained after application of layout analysis processing and character recognition processing, then the document image data and even its layout can be acquired. Since utilizing the acquired layout when desired document image data is retrieved from the retained document image data is useful in improving retrieval efficiency, document image data retention formats in which the results of layout analysis processing and the results of character recognition processing are preserved in correspondence with the document image data have begun to appear.

Such formats for preserving document image data in many cases are the file formats of specific applications. Examples are the RTF (Rich Text Format) of Microsoft Corporation and HTML (HyperText Markup Language) that is often used in connection with the Internet.

However, file formats of specific applications are sometimes not compatible and can reduce conversion accuracy. Accordingly, there is need for an intermediate format wherein information obtained from results of layout analysis processing and character recognition processing is preserved in as great an amount as possible and is so adapted as to maintain accuracy in order to enable conversion to various applications.

There have been proposed intermediate formats that make conversion possible regardless of the application or system. Examples are the SGML format and the PDF (Page Description Format). Generically, such an intermediate format is referred to as a DAOF (Document Analysis Output Format).

When document image data is preserved and converted, the preservation and conversion is carried out after the document image data is itself changed to bitmap data or compressed. While the above-mentioned preservation format is suitable for image data such as data representing a natural image, retrieval is not possible if the data is document image data. Though document image data may be retained upon being compressed, there is also a need for a preservation format wherein document image data is subjected to image analysis to obtain character codes, a layout description and a description for putting figures and pictures from document image data into the form of images. The preservation format should be applicable to spreadsheet software in which tables are structurally analyzed.

As means for performing such analysis, the conventional DAOF analyzes document image data and preserves document image data in the form of a layout description, character recognition description, table structure description and image description.

The structure of data in the conventional DAOF will be described with reference to FIG. 11.

FIG. 11 illustrates the structure of data in DAOF according to the prior art.

As shown in FIG. 11, the data structure includes a header 1101, in which information relating to document image data to be processed is retained; a layout description data field 1102 for retaining attribute information and rectangular address information of each block recognized for every attribute such as TEXT (characters), TITLE, CAPTION, LINE ART (line images), PICTURE (natural images), FRAME and TABLE contained in document image data; a character recognition description data field 1103 which retains results of character recognition obtained by applying character recognition to TEXT blocks such as TEXT, TITLE and CAPTION; a table description data field 1104 for retaining the details of the structure of a TABLE block; and an image description data field 1105, in which image data of a block such as a PICTURE or LINE ART block is extracted from document image data and retained.

There are instances where these DAOFs are themselves preserved as files and not just intermediate data. A large number of intermediate formats are preserved, and the management and retrieval thereof is important. Unlike instances in which only document image data is preserved, in this case a search by character information is possible. There is strong demand for a search capability utilizing such a DAOF.

However, the conventional DAOF utilizes the results of layout analysis processing and character recognition processing for the purpose of reproducing document image data faithfully. Consequently, desired document image data cannot be searched and groups of document image data associated with this document image data cannot be classified into groups. Further, in order to implement such processing, it is necessary to provide versatility by the logical relationship between data managed by the DAOF.

SUMMARY OF THE INVENTION

Accordingly, an object of the present invention is to provide an information processing apparatus and method, as well as a computer readable memory therefor, in which document image data can be utilized and managed more efficiently.

According to the present invention, the foregoing object is attained by providing an information processing apparatus for managing entered document image data, comprising: structure analyzing means for analyzing structure of the entered document image data; character recognition means for recognizing a character string in a text block that has been analyzed by the structure analyzing means; language analyzing means for applying language analysis to results of character recognition performed by the character recognition means; extraction means for extracting synonyms and equivalents of words obtained as results of language analysis performed by the language analyzing means; conversion means for converting a word obtained as the result of language analysis to a word in another language; translation means for translating a character string in a text block that has been analyzed by the structure analyzing means to another language; and storage means for storing at least results of analysis by the structure analyzing means, results of character recognition by the character recognition means and results of language analysis by the language analyzing means, and for storing at least one of the results of extraction by the extraction means, results of conversion by the conversion means and results of translation by the translation means in association with the results of character recognition.

The storage means preferably stores the results of analysis by the structure analyzing means and the results of character recognition by the character recognition means in a data structure in which these results are described logically.

The storage means preferably stores synonyms and equivalents, which are the results of extraction by the extraction means, as individual words and in a form linked to the results of character recognition by the character recognition means.

The storage means stores the words of the other language, which are the results of conversion by the conversion means, in a form linked to the results of character recognition by the character recognition means.

The storage means preferably stores the results of translation by the translation means in a form linked to the results of character recognition by the character recognition means.

The foregoing objects are attained by providing an information processing method for managing entered document image data, comprising: a structure analyzing step of analyzing structure of the entered document image data; a character recognition step of recognizing a character string in a text block that has been analyzed by the structure analyzing step; a language analyzing step of applying language analysis to results of character recognition performed by the character recognition step; an extraction step of extracting synonyms and equivalents of words obtained by results of language analysis performed by the language analyzing step; a conversion step of converting a word obtained as the result of language analysis to a word in another language; a translation step of translating a character string in a text block that has been analyzed by the structure analyzing step to another language; and a storage step of storing, in a storage medium, at least results of analysis by the structure analyzing step, results of character recognition by the character recognition step and results of language analysis by the language analyzing step, and for storing in the storage medium, at least one of the results of extraction by the extraction step, results of conversion by the conversion step and results of translation by the translation step in association with the results of character recognition.

The foregoing objects are attained by providing a computer readable memory storing program code for information processing for managing entered document image data, comprising: program code of a structure analyzing step of analyzing structure of the entered document image data; program code of a character recognition step of recognizing a character string in a text block that has been analyzed by the structure analyzing step; program code of a language analyzing step of applying language analysis to results of character recognition performed by the character recognition step; program code of an extraction step of extracting synonyms and equivalents of words obtained by results of language analysis performed by the language analyzing step; program code of a conversion step of converting a word obtained as the result of language analysis to a word in another language; program code of a translation step of translating a character string in a text block that has been analyzed by the structure analyzing step to another language; and program code of a storage step of storing, in a storage medium at least results of analysis by the structure analyzing step, results of character recognition by the character recognition step and results of language analysis by the language analyzing step, and for storing at least one of the results of extraction by the extraction step, results of conversion by the conversion step and results of translation by the translation step in association with the results of character recognition.

Thus, in accordance with the present invention, as described above, it is possible to provide an image processing apparatus and method through which document image data can be utilized and managed more efficiently.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail with reference to the drawings.

Figure 1:
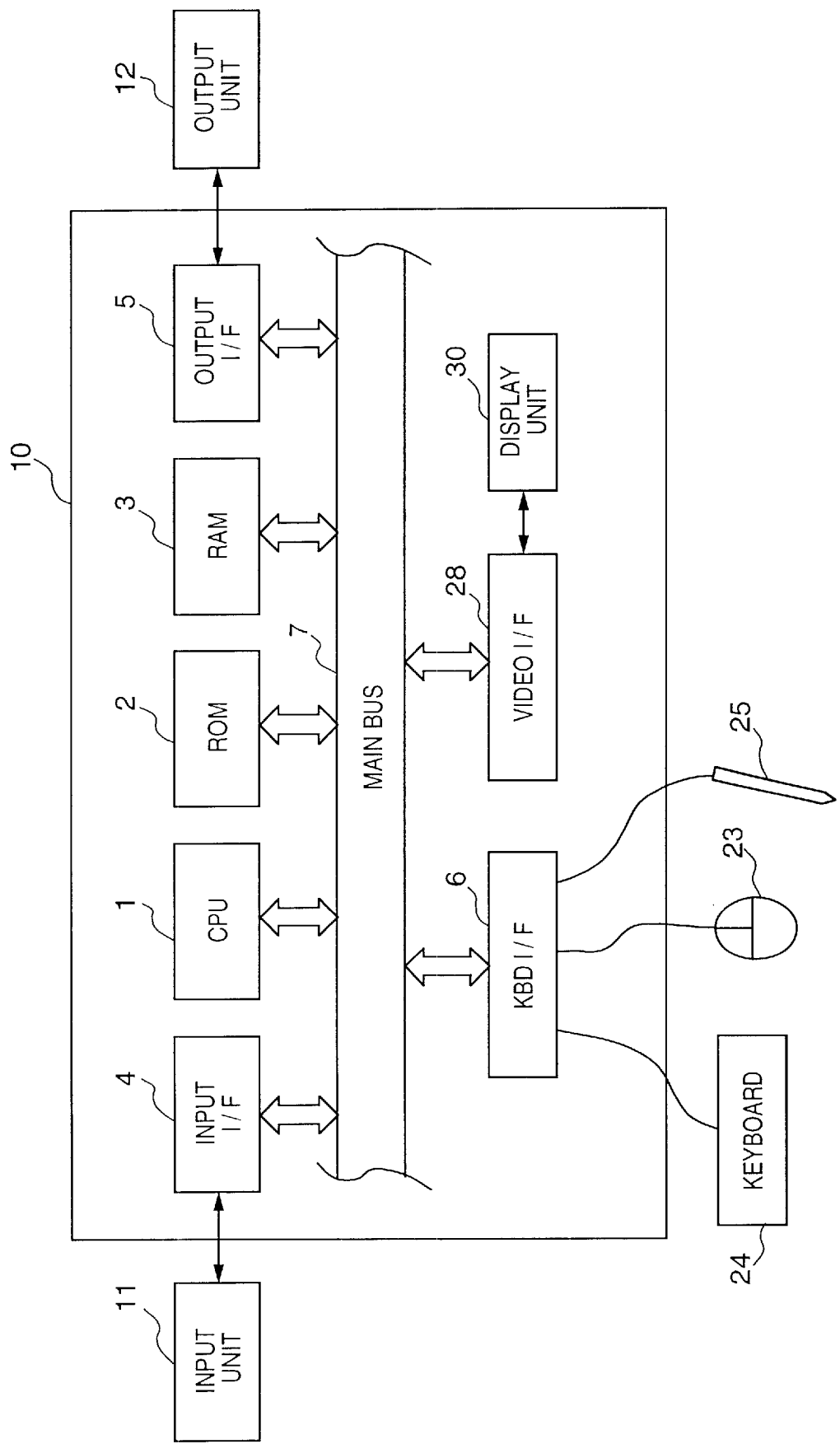
FIG. 1 is a block diagram illustrating the construction of an information processing apparatus according to an embodiment of the present invention.

FIG. 1 is a block diagram illustrating the construction of an information processing apparatus 10 according to a preferred embodiment of the present invention.

As shown in FIG. 1, the information processing apparatus 10 includes a CPU 1 for executing overall control of the apparatus and for controlling an externally connected input unit 11 (e.g., an image scanner, a storage device, another information processing apparatus connected via a network, a facsimile machine connected via a telephone line, etc.) via an input interface (I/F) 4. Further, the CPU 1 controls an externally connected output unit 12 (e.g., a printer, a monitor, another information processing apparatus connected via a network, a facsimile machine connected via a telephone line, etc.) via an output interface (I/F)5. In accordance with an indication entered from input means (e.g., a keyboard 24, pointing device 23 or pen 25)6 via a keyboard interface (KBD I/F), the CPU 1 executes a series of processing operations such as image input, image processing, color conversion processing and image output control. Further, the CPU 1 controls a display unit 30 via a video interface (I/F) 28. The display unit 30 displays image data entered from the input unit 11 or image data created using the keyboard 24, pointing device 23 or pen 25.

The information processing apparatus 10 further includes a ROM 2 storing various control programs executed by the CPU 1 to perform various control operations. The operating system, a control program for implementing the present invention and other programs are loaded in a RAM 3 and executed by the CPU 1. The RAM 3 also functions as a work area for various operations and as a temporary save area used to run the control program. A VRAM (not shown) is provided for temporarily retaining image data entered from the input unit 11 or image data created using the keyboard 24, pointing device 23 or pen 25.

Figure 2:
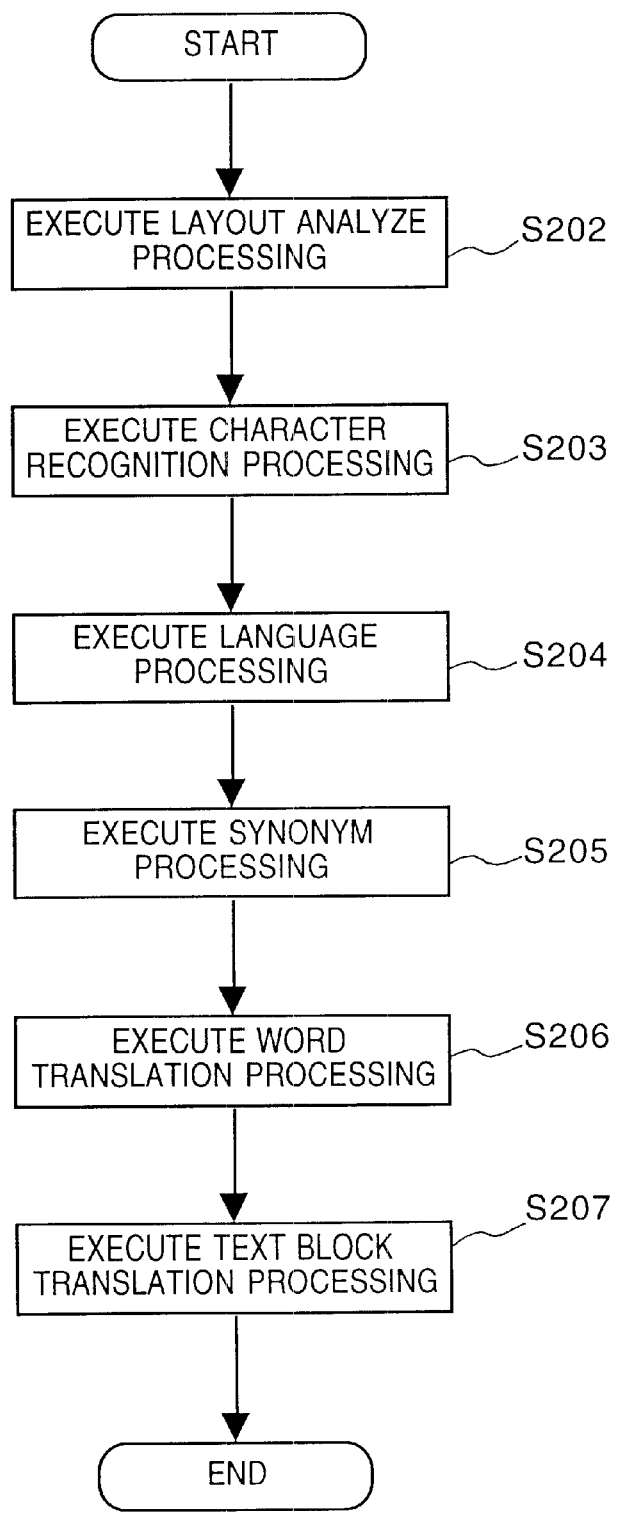
FIG. 2 is a flowchart illustrating an overview of processing executed according to this embodiment.

An overview of processing executed according to this embodiment will be described with reference to the flowchart of FIG. 2, which illustrates this processing.

Document image data is accepted and subjected to layout analysis (the details of which will be described later) and blocks are analyzed according to such attributes as TEXT, TITLE, CAPTION, LINE ART, PICTURE, FRAME and TABLE at step S202. This is followed by character recognition (the details of which will be described later) at step S203. This processing is applied to a TEXT block, which has been recognized by layout recognition, and is executed on a character-by-character basis. Several results of recognition are retain as a first candidate, second candidate and so on. Next, by using a first candidate of the character recognition results, natural language processing is executed to determine words corresponding to character strings obtained as the result of character recognition (step S204). This language processing is such that if a character is construed to be odd based upon the context of a candidate character string, a correct character is extracted from candidate characters and is substituted for the first candidate. Alternatively, a correct character may not be included among the candidates, in which case characters are applied anew. The result of such processing is reflected by revising the candidate character string retained as the results of character recognition.

Next, at step S205, synonym processing for extracting synonyms or equivalents is executed for every word obtained as the result of language processing. Though extracted synonyms may be greater or fewer than the original character string that is the result of language processing, it will suffice to create a data structure anew and establish a link to a character string retained as the result of character recognition. Next, by using machine translation, word translation processing is executed to extract words of another language from a word string obtained as the result of language processing (step S206). This is followed by step S207, at which TEXT BLOCK translation processing is executed to employ machine translation for translating the first candidate of the results of character recognition processing. TEXT BLOCK translation processing is such that when the result of character recognition is incorrect, the result of translation will often be erroneous. However, erroneous translation can be reduced by subjecting the result of language processing to translation again or by having the user correct the translation error via the input unit. It should be noted that machine translation creates an appropriate translation from context. With this processing, therefore, translation processing is applied not to results on a per-character basis but to a character string of continuous text. Since the translation is of variable length, a data structure is created anew and a link to the character string that is the result of character recognition is established just as in the case of synonym processing.

The specifics of the processing set forth above will be described in detail with reference to FIG. 3.

Figure 3:
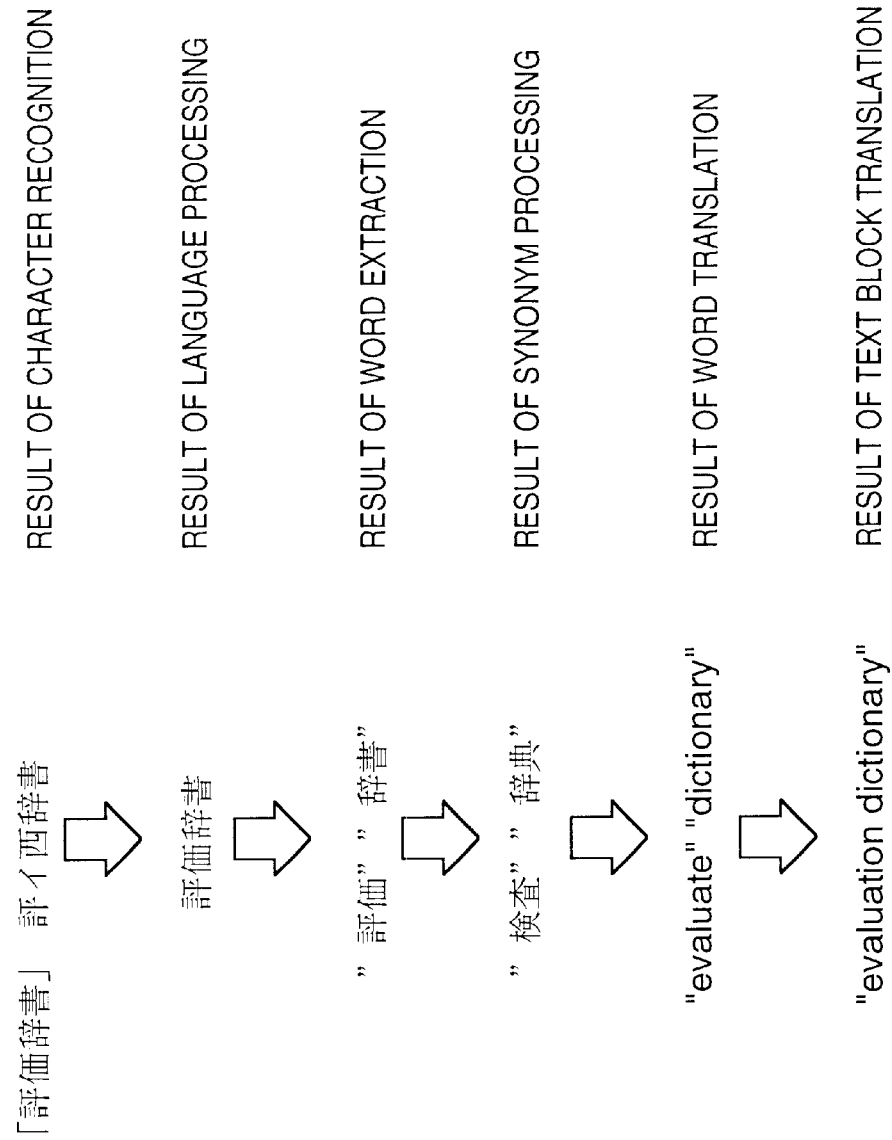
FIG. 3 is a diagram useful in describing a specific example of processing executed according to this embodiment.

FIG. 3 is a diagram useful in describing a specific example of processing executed according to this embodiment.

By way of example, assume that the character string "評価辞書" is contained in document image data. The result of character recognition of the character "価" in this character string is two characters, namely "イ" and "西". When language processing is applied to this result of character recognition, the character is recognized as the character "価". Thus, the number of characters in the result of character recognition is retained by combining the results of character recognition applied to two characters. When synonym processing is applied to the individual words "評価 (meaning evaluate)", "辞典 (meaning dictionary)", synonyms "検査 (meaning inspection)" and "辞典 (meaning encyclopedia)", for example, are extracted. This processing is implemented by storing a synonym comparison table (not shown) in the ROM 2, etc., and then referring to this table. Further, when word translation processing is applied to the individual words "評価", "辞典", the translated words "evaluate" and "dictionary" are extracted. This processing also is implemented by storing a word translation table (not shown) in the ROM 2, etc., and then referring to this table. Though an example of translation into English is illustrated here, it is possible to provide a translation into other languages such as Chinese and Korean as well. When TEXT BLOCK processing is applied to "評価辞書", the translation "evaluation dictionary", for example, is rendered. Since the example cited above is a simple compound, there is not much variation. However, in the case of sentence, an appropriate translation is rendered based upon context.

An example of processing according to this embodiment will be described with reference to FIG. 4.

Figure 4:
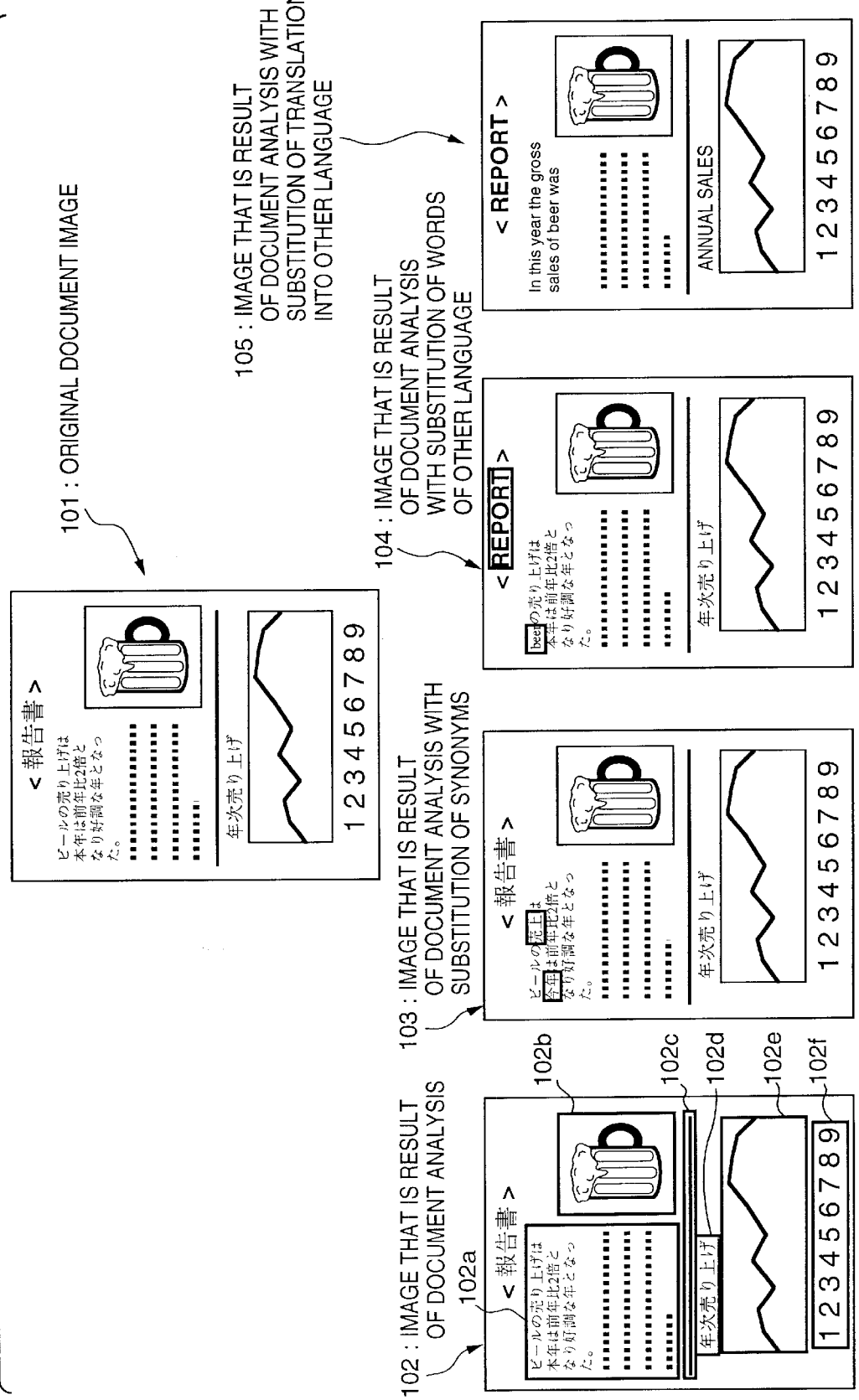
FIG. 4 is a diagram illustrating an example of processing according to this embodiment.

FIG. 4 is a diagram illustrating an example of processing according to this embodiment.

When layout analysis and character recognition are applied to document image data 101, an image 102 that is the result of document analysis is created. Analytical frames 102a–102f in which analysis is performed based upon layout analysis are indicated in the image 102. Next, when synonym processing is executed, an image 103 is created. The image 103 is the result of document analysis with substitution of synonyms. The image 103 is obtained by applying language processing to the results of character recognition, extracting synonyms on a word-by-word basis and substituting these synonyms for corresponding words in the results of character recognition.

Next, word translation processing is applied, whereupon an image 104 is created. The image 104 is the result of document analysis with substitution of words of another language. The image 104 is obtained by applying translation on a per-word basis to the result of language processing and substituting the translated words of another language for corresponding words in the results of character recognition. This is followed by the application of TEXT BLOCK translation processing, whereupon an image 105 is created. The image 105 is the result of document analysis with substitution of the translation into the other language. The image 105 is obtained by subjecting a TEXT BLOCK, which has been analyzed by layout analysis, to machine translation (the machine translation is applied to the character string in the TEXT BLOCK in accordance the order of analysis) and substituting the results of translation for the corresponding text block.

Thus, in accordance with this embodiment, the above-described processing is applied to each block recognized from the document image data and links are established to each result of processing. This makes it possible to manage each result of processing without sacrificing the layout of the document image data.

Figure 5:
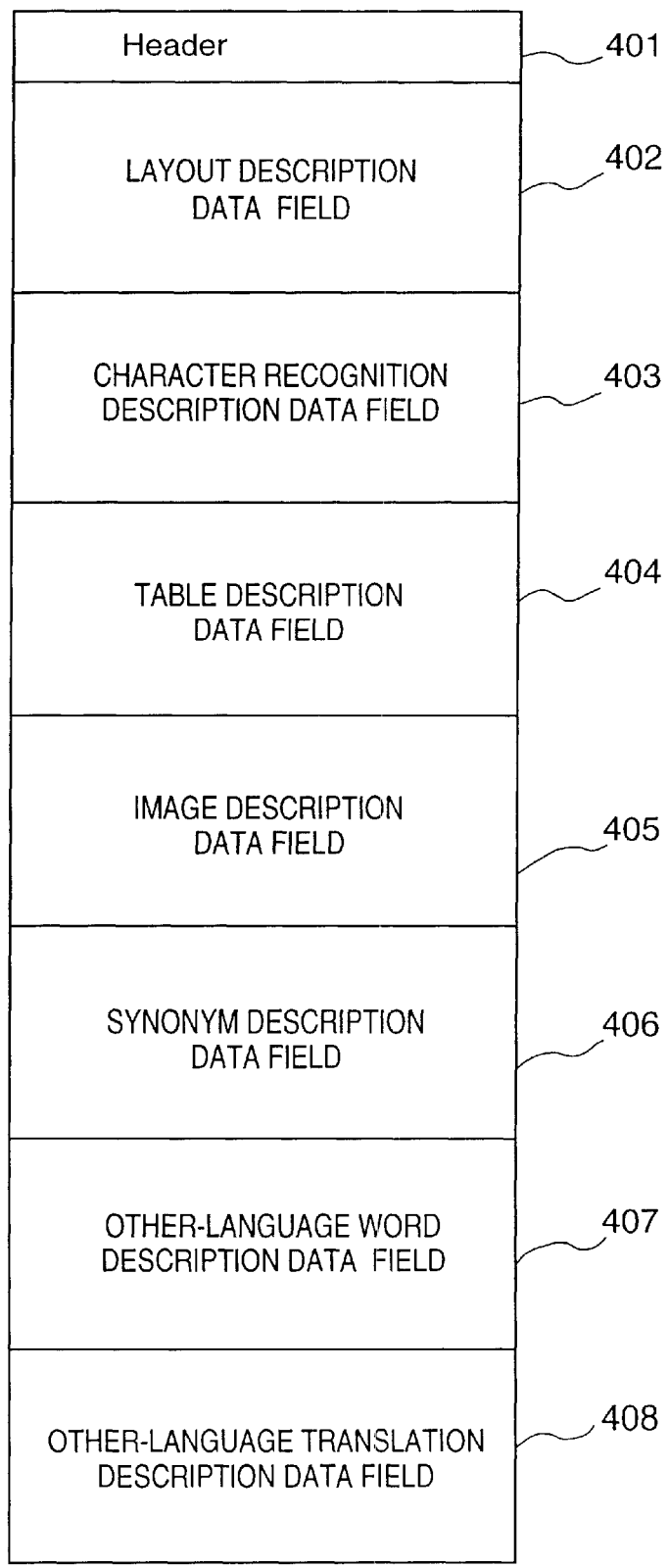
FIG. 5 is a diagram illustrating an example of a data structure in which results of processing obtained by processing according to this embodiment are retained.

Reference will now be had to FIG. 5 to describe an example of data structure which retains each result of processing obtained by processing executed in accordance with this embodiment.

As shown in FIG. 5, the data structure includes a header 401, in which information relating to document image data to be processed is retained; a layout description data field 402 for retaining results of layout analysis processing; a character recognition description data field 403 which retains results of character recognition processing; a table description data field 404 for retaining data relating to a TABLE block that has been analyzed by layout analysis processing; an image description data field 405 for retaining data relating to an image block such as a PICTURE block that has been recognized by layout analysis processing; a synonym description data field 406 for retaining results of synonym processing; an other-language word description data field 407 for retaining results of word translation processing; and an other-language translation description data field 408 for retaining results of TEXT BLOCK processing.

It should be noted that the synonym description data field 406, other-language word description data field 407 and other-language translation description data field 408 exist independently because retained data such as a character string varies depending upon the content of processing and information regarding the features of each field is required. For example, the character recognition description data field 403 retains data on a per-character basis but the synonym description data field 406 and other-language word description data field 407 retain data on a per-word basis. Further, the other-language translation description data field 408 requires information relating to the TEXT BLOCK that was the object of translation.

The details of the example of data structure shown in FIG. 5 will now be described with reference to FIG. 6.

Figure 6:
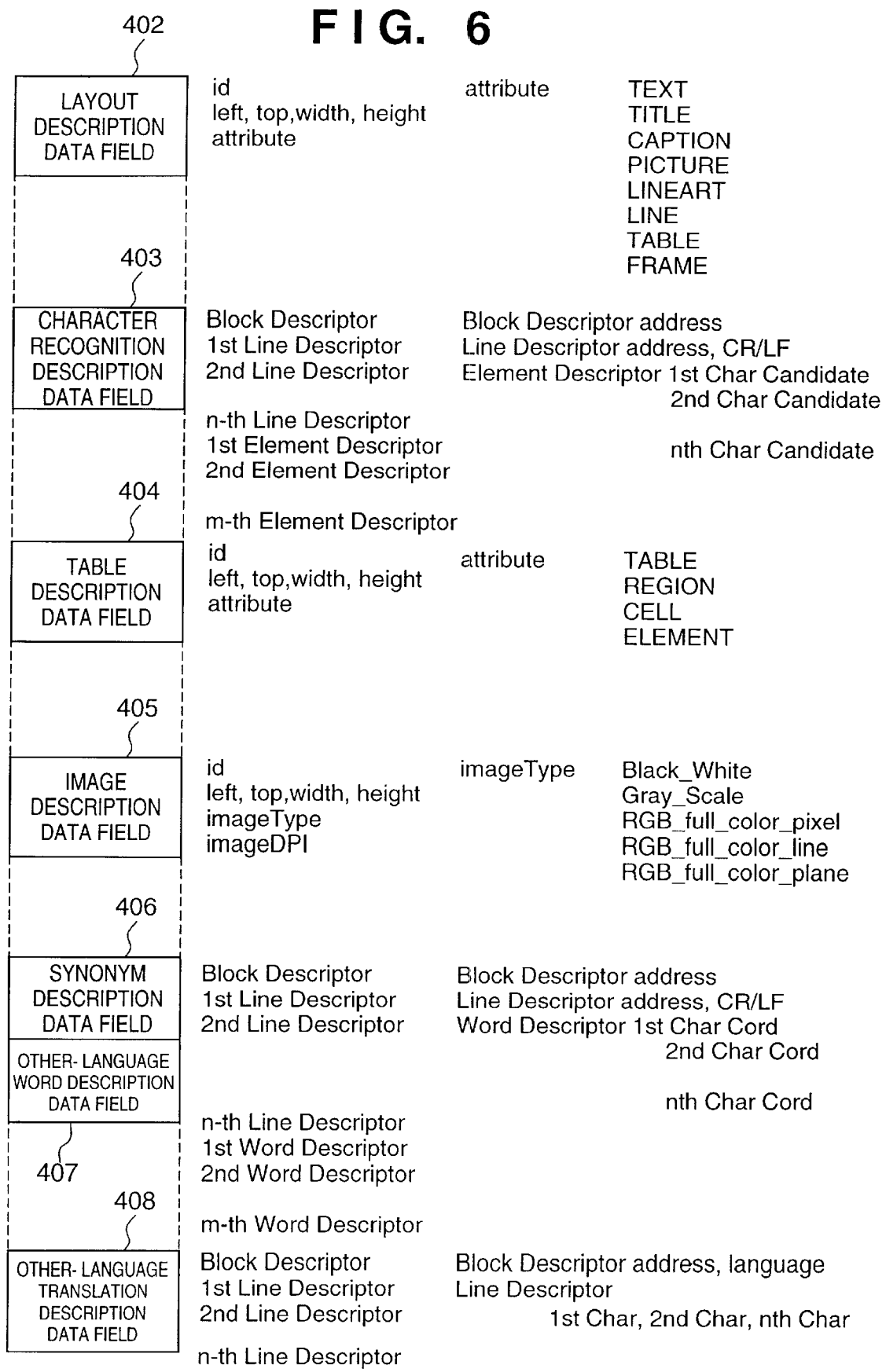
FIG. 6 is a diagram showing the details of the data structure of FIG. 5 according to this embodiment.

As shown in FIG. 6, the layout description data field 402 retains the rectangular address of each block that has been subjected to layout recognition as well as the attributes of the block. Various other information is omitted. The character recognition description data field 403 retains detailed information of a target TEXT block at a block descriptor. Information for each line of the TEXT BLOCK is retained at a line descriptor. These are mainly generated from information obtained character extraction processing executed in character recognition processing. The result of character recognition processing is described by an element descriptor; results are described from first through nth candidates. Ordinarily, up to eight candidates are retained.

The table description data field 404 is provided with TABLE, REGION, CELL and ELEMENT as attributes, in addition to rectangular information analyzed as being table blocks in layout analysis processing. TABLE indicates an area representing a table overall; REGION indicates an area representing the largest frame enclosed by a frame of ruled lines; CELL indicates the smallest frame that signifies a table; and ELEMENT indicates the frame of a character-string area of one individual line.

The image description data field 405 retains information indicating rectangular information of an image block such as PICTURE analyzed by layout analysis processing, information indicating the type of image and information indicating resolution. The synonym description data field 406 and other-language word description data field 407 have a block descriptor and line descriptors similar to those of the character recognition description data field 403 and retain word descriptors. These fields store synonyms and words in other languages. The other-language translation description data field 408 has a block descriptor and line descriptors, and translation information is retained at the line descriptors.

Figure 7:
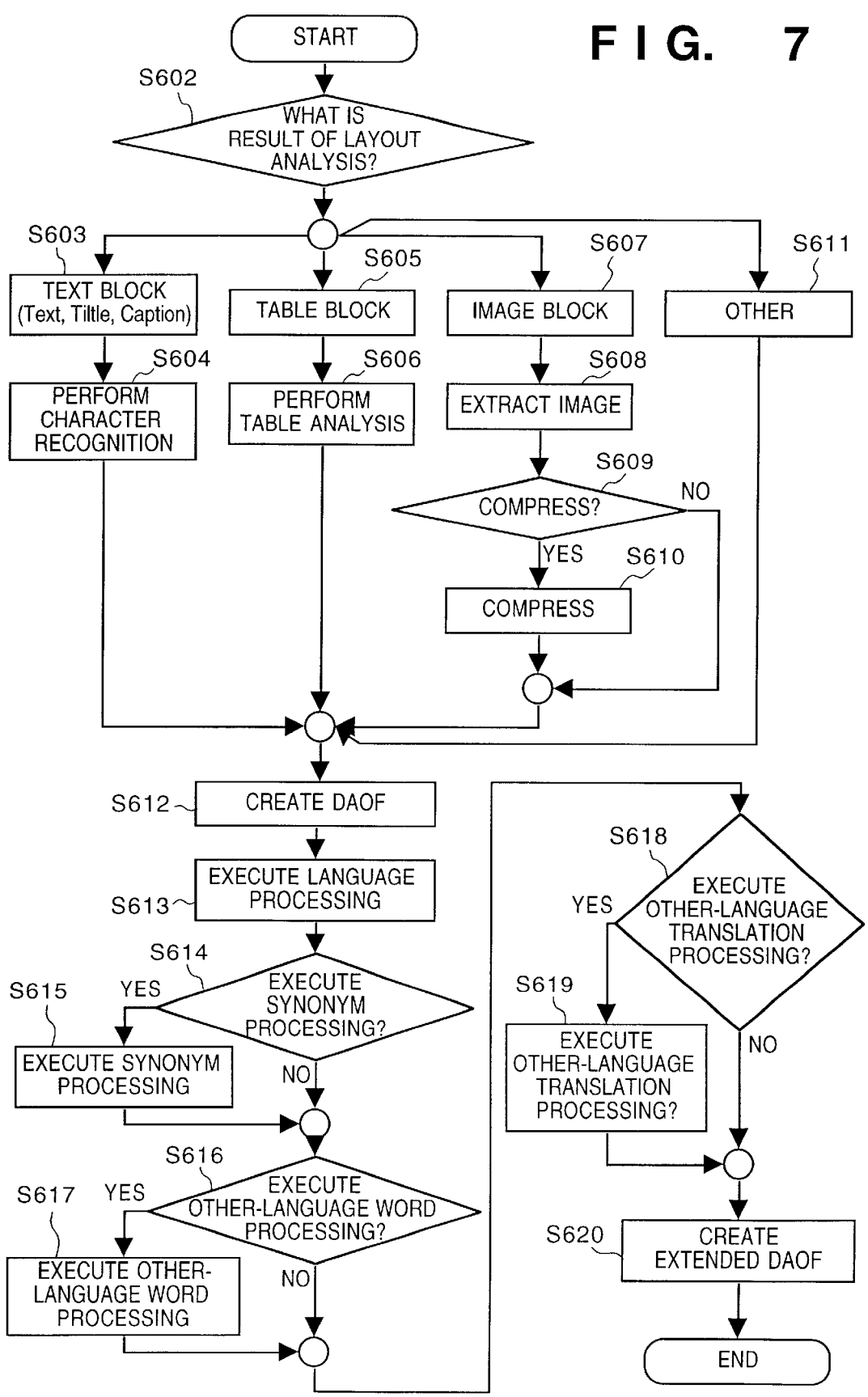
FIG. 7 is a flowchart illustrating the details of processing executed according to this embodiment.

Details of processing executed according to this embodiment will be described with reference to FIG. 7, which is flowchart of such processing.

Layout analysis processing is executed at step S602. Specifically, black pixels of document image data are detected one after another and a rectangular frame of a black pixel block is created by contour tracing or by labeling. Next, the black pixel density within the rectangular frame, the absence or presence of a neighboring rectangular frame and the length-to-width ratio of the rectangular frame are adopted as criteria and blocks are analyzed on a per-attribute basis, e.g. TABLE blocks, image blocks such as PICTURE blocks and TEXT blocks, etc. Processing corresponding to each block of the attributes analyzed by this layout analysis processing is executed.

In a case where a block is analyzed as being a TEXT block (step S603), character recognition processing is executed at step S604.

A method of extracting feature vectors and performing a comparison is an example of one method of character recognition processing executed at step S604. For example, assume that the character "本 (meaning book)" is contained in the document image data. In such case the first stage is to execute character extraction processing. This is processing for extracting the rectangle of one character. This is obtained if the state of continuity of black pixels is detected. The second stage is to cut one character into m×n blocks. For example, one character is cut into 64×64 blocks. The direction of the distribution of black pixels is then extracted from this block using a 2×2 window. Several dozen items of direction vector information are obtained by shifting the 2×2 window successively. This vector information becomes the feature of the extracted character. This feature vector is compared with a character recognition dictionary prepared in advance and characters are extracted in regular order starting from the character closest to the feature vector. The character closest to the feature vector is adopted as the first candidate, the next closest character is adopted as the second candidate, and the next closest character is adopted as the third candidate. Closeness to the feature vector is closeness to the character in terms of distance, and this is a numerical value indicative of degree of resemblance. If the degree of resemblance is high, then a character of higher accuracy is obtained.

In a case where a block is analyzed as being a TABLE block (step S605) by layout analysis processing, table analysis is executed at step S606.

In a case where a block is analyzed as being an image block such as a PICTURE block (step S607) by layout analysis processing, image extraction is performed at step S608. This is followed by step S609, at which it is determined whether the extracted image is to be compressed. In case of compression ("YES" at step S609), control proceeds to step S610, at which the extracted image is compressed. If compression is not to be carried out ("NO" at step S609), control proceeds to step S612.

In a case where a block is analyzed as being other than a TEXT block, TABLE block or image block by layout analysis processing, (step S611), this block is retained as is.

Figure 11:
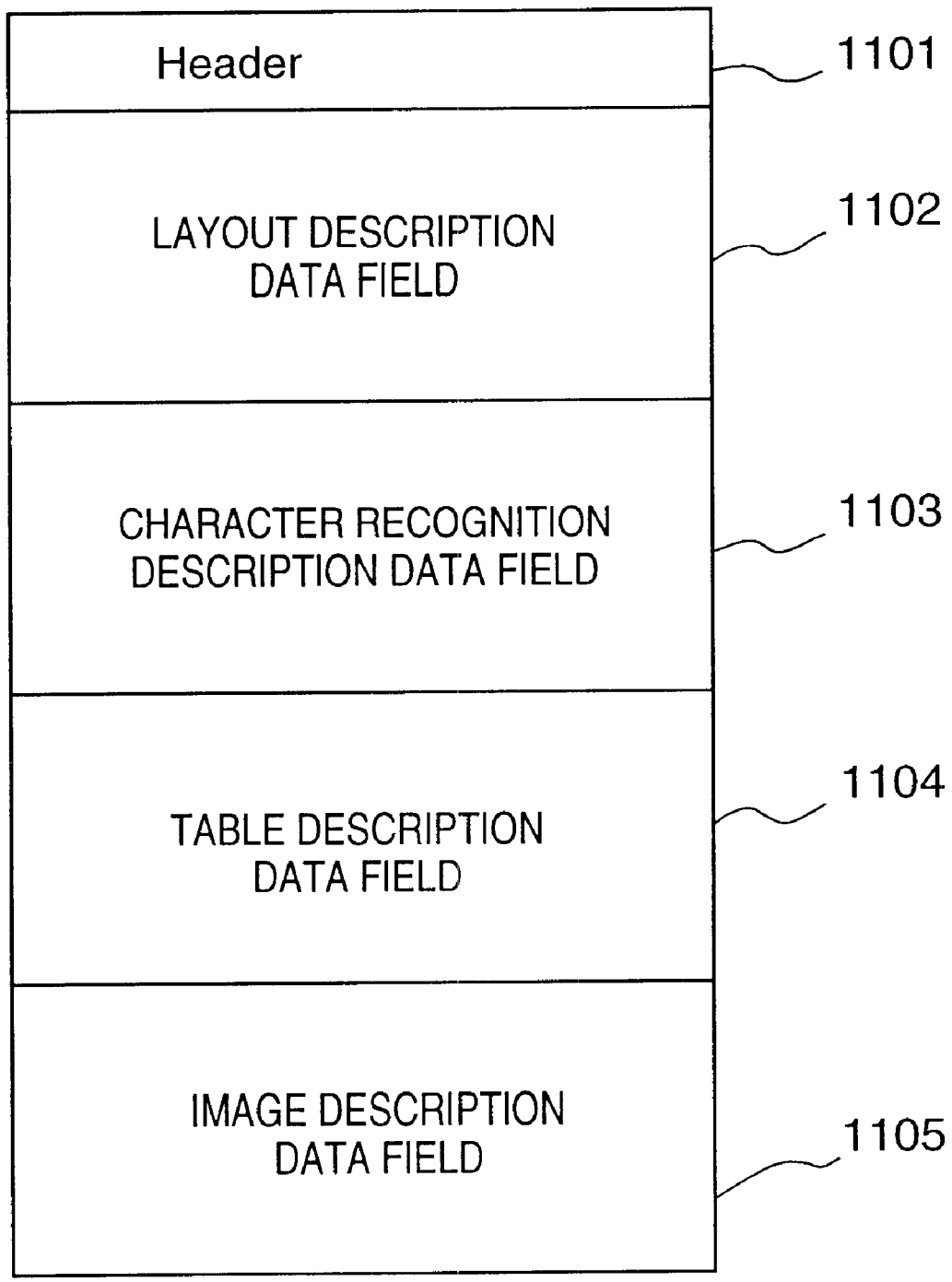
FIG. 11 is a diagram showing the structure of data according to the DAOF of the prior art.

A DAOF is created at step S612 based upon data obtained by applying processing to each block of attributes analyzed by layout analysis processing. The DAOF crated at this time has a structure similar to the conventional DAOF shown in FIG. 11.

A TEXT block is subjected to language processing at step S613, and then it is determined at step S614 whether synonym processing is to be executed. If synonym processing is to be executed ("YES" at step S614), control proceeds to step S615 and synonym processing is carried out. If synonym processing is not to be executed ("NO" at step S614), then control proceeds to step S616. Here it is determined whether other-language word processing is to be executed. If other-language word processing is to be executed ("YES" at step S616), control proceeds to step S617. If other-language word processing is not to be executed ("NO" at step S616), control proceeds to step S618. Here it is determined whether other-language translation is to be executed. If other-language translation processing is to be executed ("YES" at step S618), control proceeds to step S619. If other-language translation processing is not to be executed ("NO" at step S618), control proceeds to step S620.

At step S620 the data obtained by the processing of steps S614–S619 is added onto the DAOF that was created at step S612 and an extended DAOF is created. By way of example, a DAOF having a data structure of the kind shown in FIG. 6 can be created.

An example of application of the present invention will be described next.

Figure 8:
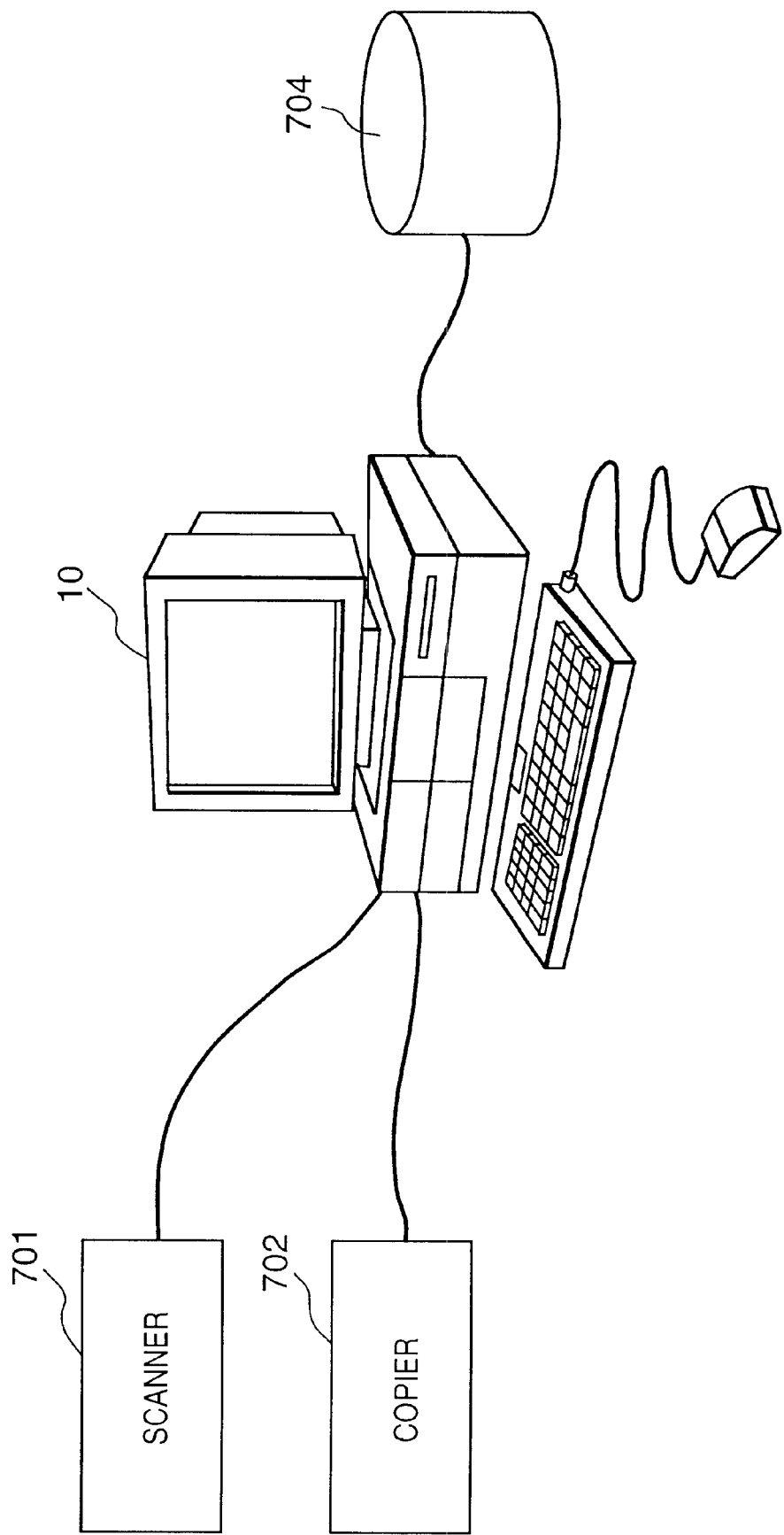
FIG. 8 is a diagram illustrating an example of the configuration of an information processing system useful in describing an application of the present invention.

FIG. 8 is a diagram illustrating an example of the configuration of an information processing system useful in describing an application of the present invention.

In the example of the information processing system shown in FIG. 8, a scanner 701 and a copier 702, which serve as image input means, are connected to a computer 10, and document image data entered from these image input means is capable of being preserved on a storage medium 704 such as a hard disk.

Figure 9:
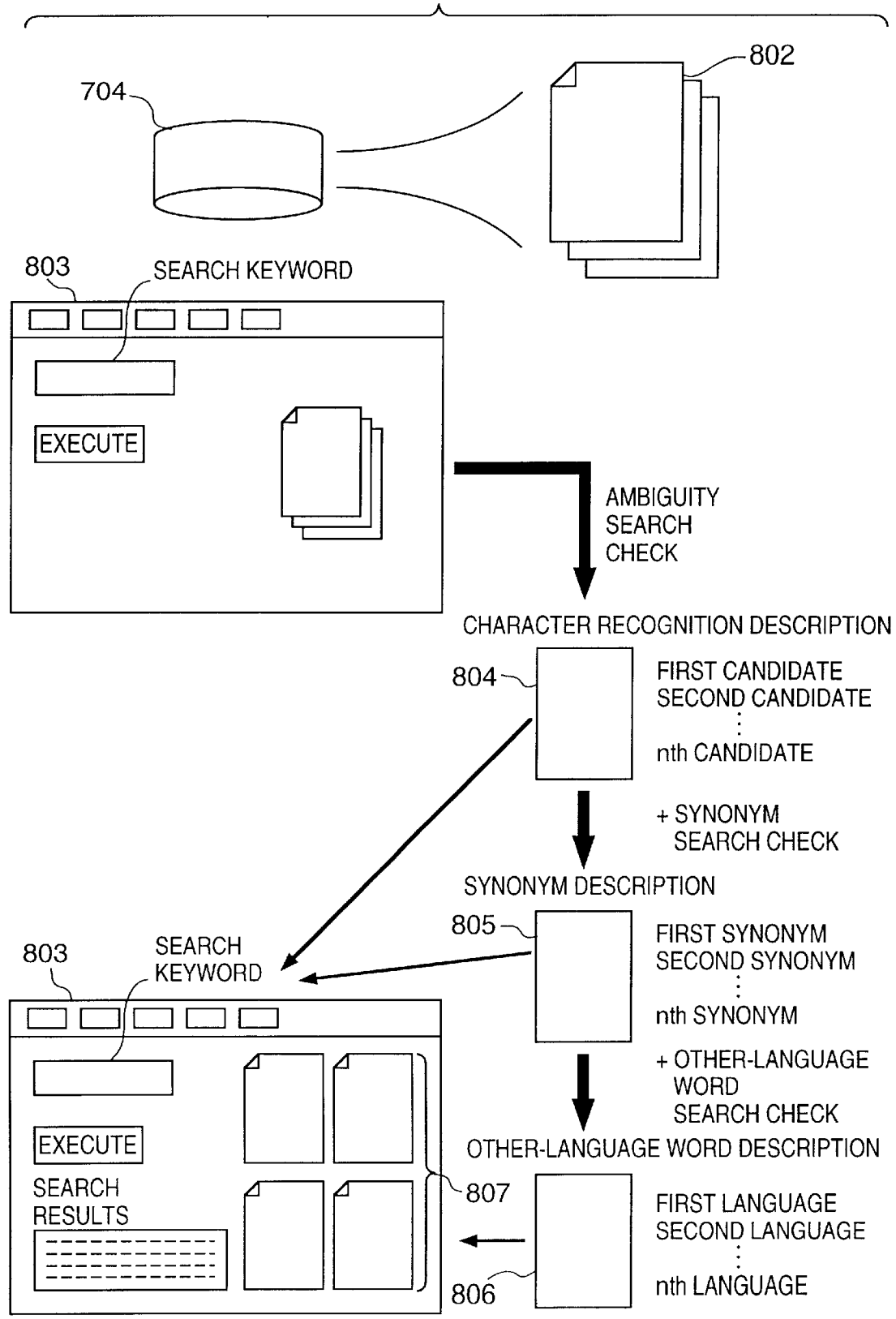
FIG. 9 is a diagram useful in describing a procedure for retrieving desired document image data from document image data that has been stored on a storage medium in the information processing system of FIG. 8.

Reference will be had to FIG. 9 to describe a case where a plurality of DAOFs obtained by the above-mentioned processing and document image data corresponding to these DAOFs are stored on the storage medium 704 of this information processing system and desired document image data is retrieved utilizing a stored DAOF.

FIG. 9 is a diagram useful in describing a procedure for retrieving desired document image data from document image data that has been stored on the storage medium in the information processing system of FIG. 8.

It is assumed here that several hundred to several thousand of document image data as well as the corresponding DAOFs have been stored on the storage medium 704. In a case where desired document image data is retrieved from these document image data, the retrieval is performed using a GUI (Graphical User Interface) 803 displayed on the display unit 30 of the computer 10. First, a character string serving as a search condition is entered in a search keyword field. For example, the search includes the searching of candidate characters, such as first and second candidates, using an ambiguity search while referring to the content of the character recognition description data field 403 of the DAOF. Further, the search is performed so as to cover omissions between words taking into consideration the accuracy of erroneous recognition in character recognition (804).

In addition to this search, a search may be performed also taking into account the content of the synonym description data field 406 as well, with reference being made to the character string of the search condition (805). This is for the purpose of retrieving document image data having similar words and synonyms in the character string serving as the search condition.

In addition to this search, a search may be performed taking into account also the content of the other-language word description data field 407 (806). As a result, it is possible to retrieve desired document image data even if a character string in another language is entered as the search condition.

By virtue of the search described above, document image data 807 in accordance with the search condition is displayed as search results on the GUI 803. It should be noted that the search method the makes reference to the content of the DAOF is not limited that set forth above. For example, it is possible to perform a search by various search methods in dependence upon user preference, as by conducting a search that takes into account the content of the other-language translation description data field 408.

Further, the form in which the search results are displayed by the GUI 803 is not limited to that shown in FIG. 9. The display may be presented in the form shown in FIG. 10.

Figure 10:
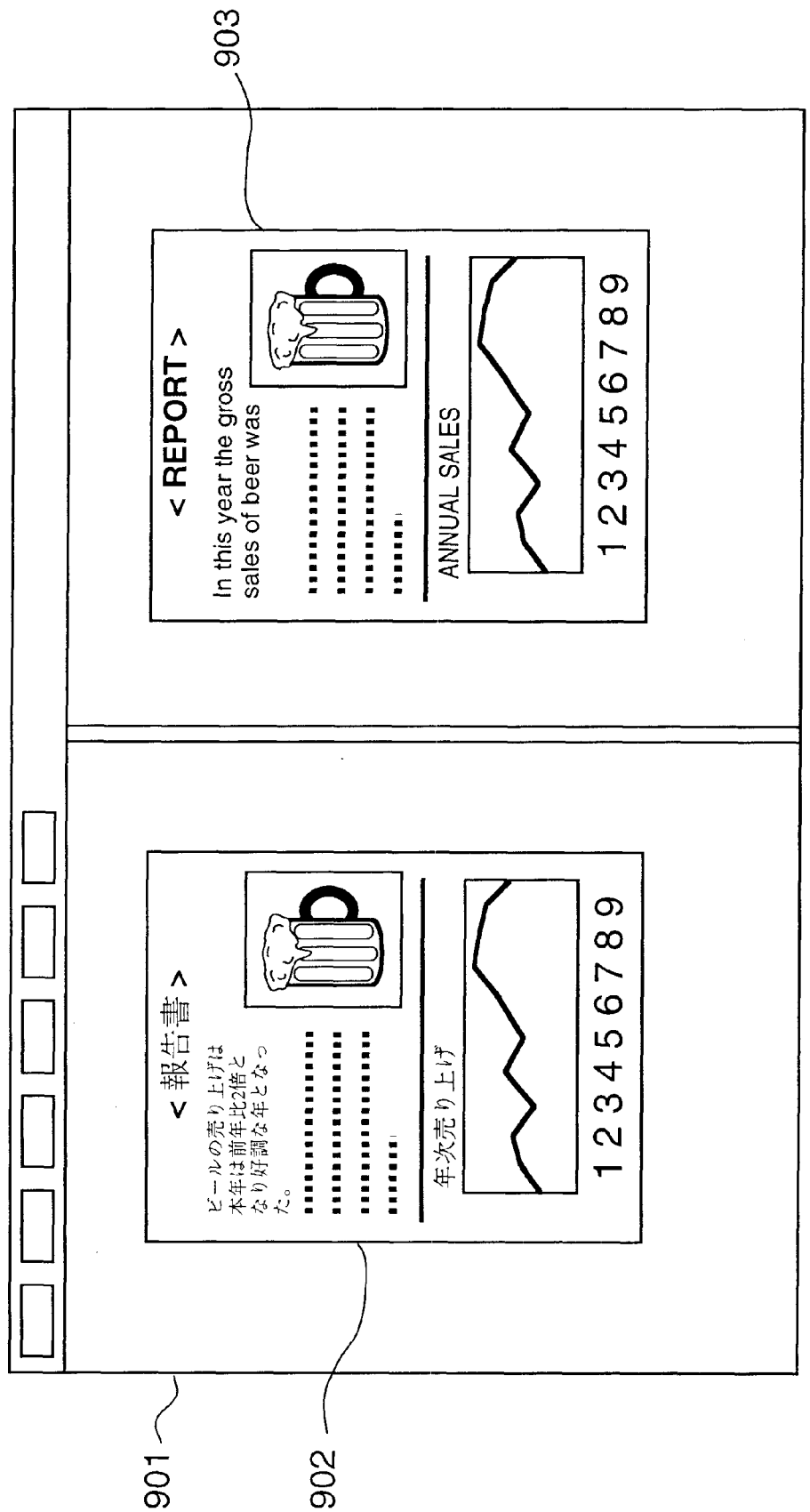
FIG. 10 is a diagram showing an example of a display of results obtained by a search according to this embodiment.

A GUI 901 shown in FIG. 10 displays, in addition to document image data 902 that is the result of a search, document image data 903 having a translated TEXT block contained in the document image data 902 created by referring to the content of the other-language translation description data field 408. By thus displaying, in side-by-side fashion, the original document image data 902 and the document image data 903 that reflects the content of the other-language translation description data field 408, it is possible to grasp the meaning of the document in the other language.

In FIG. 10, the document image data 902 and the document image data 903 that includes the translation in the other language of the TEXT block is displayed. However, an arrangement may be adopted in which the translation in the other language is displayed when the TEXT block within the document image data 902 is clicked on.

It goes without saying that it is also possible to display the results of a search that utilized the DAOF.

In this example of application, document image data is searched and retrieved. However, a DAOF of this embodiment can also be utilized as auxiliary data of document image data. For example, synonyms, words in another language and a translation in another language can be put and displayed beside a character string in document image data of another language or in document image data of mixed languages. This makes it possible to create document image data that is easy decipher.

In accordance with this embodiment, as described above, a DAOF illustrated in FIG. 6 is retained in regard to document image data. As a result, in a case where desired document image data is retrieved from document image data, it is possible to retrieve the desired data on the basis of a character string serving as a search condition if the character string is retained in the synonym description data field 406, even if the character string is not retained in the character recognition description data field 403. This makes it possible to improve the retrieval rate.

Further, it is possible to search document image data in which a language other than Japanese, e.g., English, is used as the language of the search condition. For example, in a case where patent document image data in the Japanese language is searched, it will be possible for an American to retrieve desired patent document image data using English search conditions even if Japanese-language patents are searched. Further, an equivalent method of use can be adopted in regard to other languages such as Chinese and Korean.

In a case where document image data is reutilized, document image data that has been translated into another language can also be reproduced with the same layout. Alternatively, by clicking on a desired TEXT block in document image data in an operation linked to word-processing software, it is possible to change over to a display in which only the desired portion is translated into another language. This makes it possible to read a document and its translation side by side and facilitates the reading of document image data in which other languages are mixed.

In summary, therefore, (1) it is possible to conduct an ambiguity search, a synonym search and a search in another language. (2) The result of translation into another language can be read immediately. (3) It is possible to provide ancillary means for reading document image data in another language or document image data in which other languages are mixed.

The present invention can be applied to a system constituted by a plurality of devices (e.g., a host computer, interface, reader, printer, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for managing entered document image data including one or more blocks of data, each of the blocks being a text block or a non-text block, comprising:

layout analyzing means for obtaining layout data by analyzing layout of the entered document image data, wherein the layout data include position data and attribute data of each block in the document image, wherein the attribute data for the text block(s) and the non-text block(s) are different;

character recognition means for character-recognizing character images in text blocks that have been analyzed by said layout analyzing means;

language analyzing means for applying language analysis to results of character recognition performed by said character recognition means;

creating means for creating other words from words obtained as results of language analysis performed by said language analyzing means; and storage means for storing the created other words in association with the corresponding layout data.

2. The apparatus according to claim 1, wherein said storage means stores the created other words in association with the corresponding layout data and the corresponding character recognition result.

3. The apparatus according to claim 1, wherein said creating means has extraction means, wherein said extraction means extracts synonyms and equivalents of words obtained as results of language analysis.

4. The apparatus according to claim 3, wherein said storage means preferably stores synonyms and equivalents, which are the results of extraction means, as individual words in a form linked to the corresponding layout data and the corresponding character recognition result.

5. The apparatus according to claim 1, wherein said creating means has conversion means, wherein said conversion means converts words obtained as the result of the language analysis to the other words.

6. The apparatus according to claim 5, which said storage means stores the created other words, which are results of conversion by said conversion means, in a form linked to the corresponding layout data and the corresponding character recognition result.

7. The apparatus according to claim 1, wherein said creating means has translation means, wherein said translation means translates sentences comprising words obtained as the result of language analysis to sentences comprising the other words in another language.

8. The apparatus according to claim 7, wherein said storage means preferably stores results of translation by said translation means in a form linked to the corresponding layout data and the corresponding character recognition result.

9. The apparatus according to claim 1, wherein said storage means stores the entered document image data in association with the created other words and the corresponding layout data, and wherein said information processing apparatus further comprises retrieving means for retrieving desired document image data from the stored document image data by searching the stored other words based on an entered search condition.

10. The apparatus according to claim 1, further comprising reproducing means for reproducing the document image data that has been translated into the other words, with the same layout based on the other words and the corresponding layout data stored in said storage means.

11. An information processing method for managing entered document image data including one or more blocks of data, each of the blocks being a text block or a non-text block, comprising:

- a layout analyzing step, of obtaining layout data by analyzing layout of the entered document image data, wherein the layout data include position data and attribute data of each block in the document image, wherein the attribute data for the text block(s) and the non-text block(s) are different;
- a character recognition step, of character recognizing character images in text blocks that have been analyzed in said layout analyzing step;
- a language analyzing step, of applying language analysis to results of character recognition performed in said character recognition step;
- a creating step, of creating other words from words obtained as results of language analysis performed in said language analyzing step; and
- a storage step, of storing, in a storage medium, the created other words in association with the corresponding layout data.

12. The method according to claim 11, wherein said storage step includes storing, in the storage medium, the other created words in association with the corresponding layout data and the corresponding character recognition result.

13. The method according to claim 11, wherein said creating step includes performing an extraction step, of extracting synonyms and equivalents of the words obtained as results of the language analysis.

14. The method according to claim 13, wherein said storage step preferably includes storing, in the storage medium, synonyms and equivalents, which are results of extraction in said extraction step, as individual words in a form linked to the corresponding layout data and the corresponding character recognition result.

15. The method according to claim 11, wherein said creating step includes performing a conversion step, of converting words obtained as the result of the language analysis to the other words.

16. The method according to claim 15, wherein said storage step includes storing, in the storage medium, the created other words, which are results of conversion in said conversion step, in a form linked to the corresponding layout data and the corresponding character recognition result.

17. The method according to claim 11, wherein said creating step includes performing a translation step, of translating sentences comprising words obtained as the results of the language analysis to sentences comprising the other words in another language.

18. The method according to claim 17, wherein said storage step preferably includes storing, in the storage medium, results of translation in said translation step in a form linked to the corresponding layout data and the corresponding character recognition result.

19. The method according to claim 11, wherein said storage step includes storing the entered document image data in association with the created other words and the corresponding layout data, and wherein said information processing method further comprises a retrieving step, of retrieving desired document image data from the stored document image data by searching the stored other words based on an entered search condition.

20. The method according to claim 11, further comprising a reproducing step, of reproducing the document image data that has been translated into the other words, with the same layout based on the other words and the corresponding layout data stored in the storage medium.

21. A computer readable memory storing program code for information processing for managing entered document image data including one or more blocks of data, each of the blocks being a text block or a non-text block, comprising:

- program code of a layout analyzing step, of obtaining layout data by analyzing layout of the entered document image data, wherein the layout data include position data and attribute data of each block in the document image, wherein the attribute data for the text block(s) and the non-text block(s) are different;
- program code of a character recognition step, of character recognizing character images in text blocks that have been analyzed in said layout analyzing step;
- program code of a language analyzing step, of applying language analysis to results of character recognition performed in said character recognition step;
- program code of a creating step, of creating other words from words obtained as the results of language analysis performed in said language analyzing step; and
- program code of a storage step, of storing, in a storage medium, the created other words in association with the corresponding layout data.

* * * * *